C. CROMWELL.
FENCE DROPPER AND WIRE RETAINING MEANS.
APPLICATION FILED APR. 24, 1907.
932,967.
Patented Aug. 31, 1909.
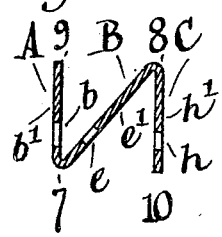
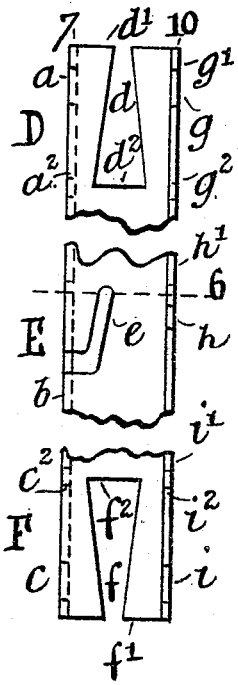
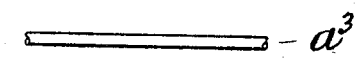
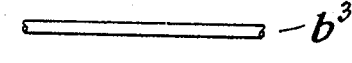
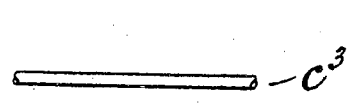
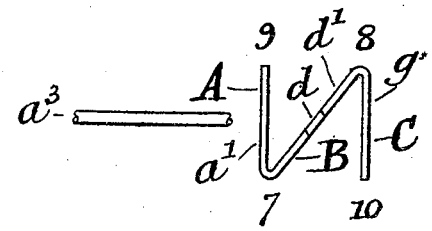
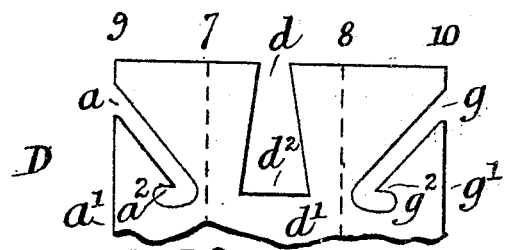
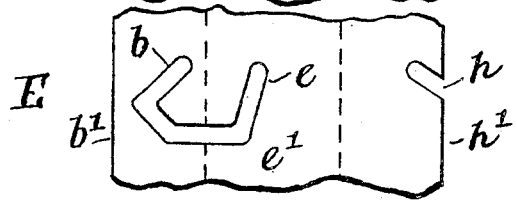
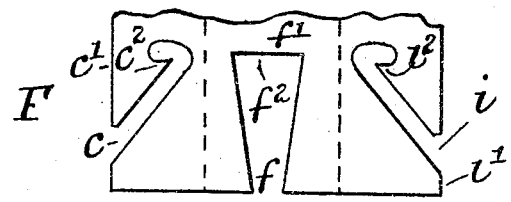
Inventor
Charles Cromwell

UNITED STATES PATENT OFFICE.

CHARLES CROMWELL, OF LONGREACH, QUEENSLAND, AUSTRALIA, ASSIGNOR TO GEORGE EDWARD BUNNING, OF DALVEEN, AUSTRALIA.

FENCE-DROPPER AND WIRE-RETAINING MEANS.

932,967.

Specification of Letters Patent.   Patented Aug. 31, 1909.

Application filed April 24, 1907.  Serial No. 370,077.

*To all whom it may concern:*

Be it known that I, CHARLES CROMWELL, a subject of the King of Great Britain and Ireland, &c., residing at Longreach, in the State of Queensland, Commonwealth of Australia, have invented certain new and useful Improvements in and Relating to Fence-Droppers and Wire-Retaining Means; and I do hereby declare the following to be a full, clear, and exact description of the invention, such as will enable others skilled in the art to which it appertains to make and use the same.

This invention is applicable to wire positioning means or stays generally, and particularly relates to the provision of fence standards which in addition to having other advantages are easily and quickly detachable when desired. For brevity, standards, stays, or the like are below termed droppers. Some droppers involve the expense and delay of using some additional locking device, as one or more tools, rods, pins, keys, clips, or hooks; some are objectionable by reason of other expense, or a want of durability or strength; and others because cattle and other animals can move them easily and so weaken or destroy the fence.

The present invention aims at providing cheap, durable droppers which shall be strong, of increased rigidity when erected, and which shall lock wires of a fence or other appropriate structure, without addition of a locking key, clip, or like part, and in such way as to allow (at will) of unlocking of the droppers, and restraining of the wires. These droppers can in many cases be placed and locked on (or unlocked and removed from) a fence in a fraction of a minute. It is not intended that when they are locked on, wires shall be strainable through them. Either when the dropper is only on loosely, that is not locked, or is off, the wires can be strained.

In carrying the invention into effect I take a blank strip of sheet steel or suitable metal, and punch out parts, and bend the blank strip into shape. When the dropper is being locked into place, it is given somewhat of a twist or strain which insures its gripping or locking on the wires as desired. The construction of dropper preferred has down one edge (other than near the ends) no aperture, and it has but slight slotting of the other edge; near the latter is an unslotted fold. These features are advantageous by allowing strength to be combined with lightness.

If a wire breaks when this invention is used, there is no slackening of the said wire on the far sides of those droppers which are nearest to the break. No wire need be pronouncedly kinked when using this invention, though a strain slightly out of alinement is in ordinary cases produced in effecting the locking. The latter is governed by the strength of and twist on the dropper, by the arrangement of the slots, and by the resistance of the wires.

In the accompanying drawings Figure 1 is a plan view in horizontal section (on about line 6 of Fig. 2) of a dropper constructed in accordance with this invention. Fig. 2 is a front elevation showing views of the dropper top, bottom, and (between these views) showing one of the several intermediate portions of the dropper. Each of these parts is intended to receive a wire. A series of fence wires is also shown. Fig. 3 is an elevation of a top, intermediate, and bottom part of the sheet metal blank before the bending of the latter into dropper form—the latter having ordinarily three planes as in Fig. 4. Fig. 4 is a plan view showing a fence top wire, and the top of a dropper.

A, B, C, represent respective longitudinal parts of a sheet steel or other suitable bar shown in Fig. 3, and having longitudinal outer edges 9, 10. Parts A and C are shown parallel, in Fig. 4, for the bar after slotting is bent on lines as 7, 8, into a form having, as two outside planes, the said members A, C, (Fig. 4) and, as a middle connecting plane, the member B. It is not essential to retain the strict shape or planes shown in Fig. 4; but though modifications are usable, that shape for many purposes is the best.

Slots or apertures for wires are illustrated; these need not be of the precise forms or in the precise positions shown; but for ordinary wire fencing what is illustrated is (though not elaborate) effective. The upper, intermediate, and lower divisions of the dropper strip A are marked respectively $a^1$, $b^1$, $c^1$;—strip B parts are marked $d^1$, $e^1$, $f^1$;—and strip C parts are marked $g^1$, $h^1$, $i^1$. The upper intermediate and lower slots, passages, or wire ways of parts A,—B,—C, are marked respectively $a$, $b$, $c$;—$d$, $e$, $f$;—and $g$, $h$, $i$. Passages $b$ and $e$ form one slot, wholly seen in Fig. 3, and partly in Fig. 2.

When the metal plate has been bent into three members or planes, the various slots at about the same level come into such relative positions that a wire can in each case be engaged with or inserted through them; and the series of wires can be forced home, locked, or gripped.

Angles of direction and relative lengths of the parts of the slots may (to vary the deflection from alinement, and to promote such grip of, or bearing on, the wires as may be desired) be somewhat varied from those shown; or curves may be substituted for straight lines in some parts;—while retaining matter of this invention. The twist put on the dropper for the purpose of locking the wires may be so slight as, when on, to pass ordinarily unnoticed. It is practicable to produce conspicuous kinking when desired by predetermined relative positioning of the slotting, but with ordinary fence wires this invention is applied to produce no conspicuous kink though there is such strain put on the wires that they are placed slightly out of straight alinement. The tops of passages $b$, $e$, and $h$ are not in a line from left to right, see Figs. 2 and 3; the top of passage $e$ is for example slightly lower than the tops of passages $b$ and $h$; the effect is that the top of the passage $e$ will hold down a wire out of a horizontal straight line or alinement; the wire also being firmly held by oblique oppositely inclined edges of passages $b$ and $h$.

To provide that in plan view from above the wire will be laterally out of a longitudinal straight line or alinement, the tops of slots $b$, $e$, and $h$ are appropriately located. These tops are thus not equidistant from the observer of Fig. 2; and as Figs. 1 and 3 show, the tops of slots $b$ and $e$ are at different distances from the nearest points of edge 7. The various slots of part E, are not in such relative positions as to permit of a stretched wire which passes through them and is locked, being then strictly horizontal in front view and also quite straight in plan view. There is enough deviation (from the straight line) in one or both the respects aforesaid to prevent the wire being further strainable while so locked. Like non-alinement may also exist in regard to part D, and to part F; as base $d^2$ of slot $d$ is shown as not so low as the bases of slots $a$, $g$; and stop $f^2$ of slot $f$ is shown as not so high as the tops of slots $c$, $i$. By making the distances of the slot ends under hooks $a^2$, $g^2$, from edges 7 and 10 respectively, differ somewhat, (as also the distances of slot ends over hooks $c^2$, $i^2$), an advantage is secured, as these differences assist in causing the dropper when under torsional strain to lock and grip the wires firmly. In the same way the tops of slots $b$ and $h$ are made in some cases to be at different distances from the edges 7 and 10 respectively. Instead of slots $b$, $e$, $h$, extending upward from their entrances, they could extend downward.

In inserting a dropper, it may conveniently be grasped and twisted as required by the right hand, while the wires are in turn pushed into place by the left. The dropper may be perpendicularly held alongside the wires on the side remote from the operator whose hand may pass between the wires, (which he would be facing) as $a^3$, $b^3$, $c^3$ in Fig. 2. By holding the vertical dropper in a suitable position the top and bottom fence wires, respectively, may (in turn) be readily engaged with the respective top and bottom slots, without forcing the wires to the slot inner ends. The dropper (still vertical) will then be positioned, (or may be slightly turned) so that its nearest edge to the intermediate wires as $b^3$ in front of it, will be edge 7. The latter wires are then easily entered into their respective slots at edge 7, and they may enter also their slots in edge 10. The dropper is then loosely on, without torsion. Then to lock the wires the operator may with the left hand press the top wire down to the inner ends of the slots in part D, while giving the dropper top a twist to so position passages $a$, $g$, as to avoid obstructing the wire. There is at the inner ends of slots $a$ and $g$ a bend, curve, or notch, so that there are lugs, or hooks, or means $a^2$, $g^2$, to there retain the wire in locked position. Under these lugs or hooks the wire is thus forced, and firmly locked. There will then be some torsion of the dropper maintained by the presence of the wire. The said twisting action also locks or partially locks one or more intermediate wires.

The next step is to lock the bottom wire by pressing it up while twisting the dropper bottom slightly in a direction to facilitate this, until the bottom wire is securely locked over hooks or lugs $c^2$, $i^2$, which are provided by giving slots $c$ and $i$ suitable curves, bends, or notches at their upper ends. This final twist completes the locking of the dropper, which is then left under torsional strain.

In order to remove or loosen a dropper the procedure is reversed. Thus one may slightly twist one end, as the top, so as to allow of freeing the top wire from hooks or holding means $a^2$, $g^2$. The wire can then be lifted clear. Then the other end wire (as the bottom one) is similarly freed while twisting the dropper base slightly. The dropper will then be easily loosened from the intermediate slots and lifted clear of the fence. This three sided locking dropper by its resistance to torsion when locked on wires, enables great strength to be combined with light weight.

What I do claim as my invention and desire to secure by Letters Patent of the United States is:—

1. A fence dropper comprising a bar Z shaped in cross section and having a slot in each member thereof for the passage of a single wire, the wire holding portions of said slots being out of alinement in a vertical plane.

2. A fence dropper comprising a bar Z shaped in cross section and having a slot in each member thereof for the passage of a single wire, the wire holding portions of said slots being out of alinement in horizontal and vertical planes.

3. A fence dropper comprising a flexible bar Z shaped in cross section, each member having a slot therein extending through one of the edges and the wire holding portions of the slots being so disposed in relation to each other so as to distort the wire both vertically and horizontally.

4. A fence dropper comprising a middle bar having side flanges, said middle bar having a slot therein extending from one end edge, a slot in each flange, the inner end of the middle slot being out of alinement with the inner ends of the flange slots, the three slots serving to hold a fence wire out of horizontal alinement.

5. A fence dropper having end holding means, comprising a middle bar having a slot extending and widening inwardly from each end, and side flanges having slots extending from the flange sides, and oppositely to one another.

6. A fence dropper slotted at the middle and sides of each end to receive wires, the longitudinal distance between the inner ends of the intermediate slots being greater than that between the inner ends of the side slots.

7. A fence dropper having three upper end slots, consisting of two outer slots which extend downward inwardly then outwardly, and an intermediate slot which widens while extending downward.

8. A fence dropper bent to form a middle bar and side flanges, a slot in one bend to hold a wire, the edge of a flange being slotted for the same wire.

9. A fence dropper having flanges, one flange having an edge slot to receive a wire, the dropper having in a bend another slot the ends of which are at different distances from the bend, to receive and lock the same wire out of alinement.

10. A fence dropper having a middle bar and side flanges, all having series of slots to receive intermediate wires of a fence, the inner ends of the slots being out of alinement in a vertical plane so as to hold a wire therein.

11. A fence dropper having a middle bar and side flanges, all having series of slots to receive intermediate wires of a fence, the inner end of the middle bar slot being at a different height to the inner ends of the flange slots.

12. A dropper slotted to be held upon a series of wires, and having at one end two slots each extending from one edge of the dropper inwardly and having their inner ends extending horizontally and a central slot extending downwardly from the end, said slot having an enlarged lower end, the other end of the dropper having slots therein similar to the slots in the other end but extending in the opposite direction.

13. A dropper slotted to be held upon a series of wires, and folded into three members, said dropper having a slot $b$, $e$, with its entrance at a fold and a slot in the dropper edge, the inner edges of said slots being arranged to lock the wire out of straight alinement.

14. A dropper slotted to engage a series of wires, and having two folds, said dropper having three sets of slots therein, said slots having entrances in the top, bottom and two longitudinal outer edges and in one of the folds the inner edges of the slots of each set being arranged to distort the wire out of straight alinement.

15. A dropper slotted to engage wires and arranged to hold the wires out of a straight line both laterally and horizontally when the dropper is positioned on the wire.

16. A dropper for wire fencing, having respective sets of three slots each for intermediate top and bottom wires, the space for the wire at the inner end of each middle slot being out of horizontal alinement with the spaces for the wire in the side slots, for the purpose of distorting the wires, in the direction set forth.

17. A fence dropper having for each intermediate wire a set of three slots, the two side ones having inner ends on the same level, and the middle one having its inner end at a different level whereby to bend the wire from a horizontal position.

18. A fence dropper having at the top end and at the bottom end respectively, a set of three slots, the two side slots in both sets being alike in form but inclining oppositely, the top middle one having its inner end higher and the bottom middle one its inner end lower than the inner ends of the adjacent side slots, substantially as described.

In witness whereof I have hereunto set my hand in the presence of two witnesses.

CHARLES CROMWELL.

Witnesses:
H. RYLAND,
J. G. SPOONER.